UNITED STATES PATENT OFFICE.

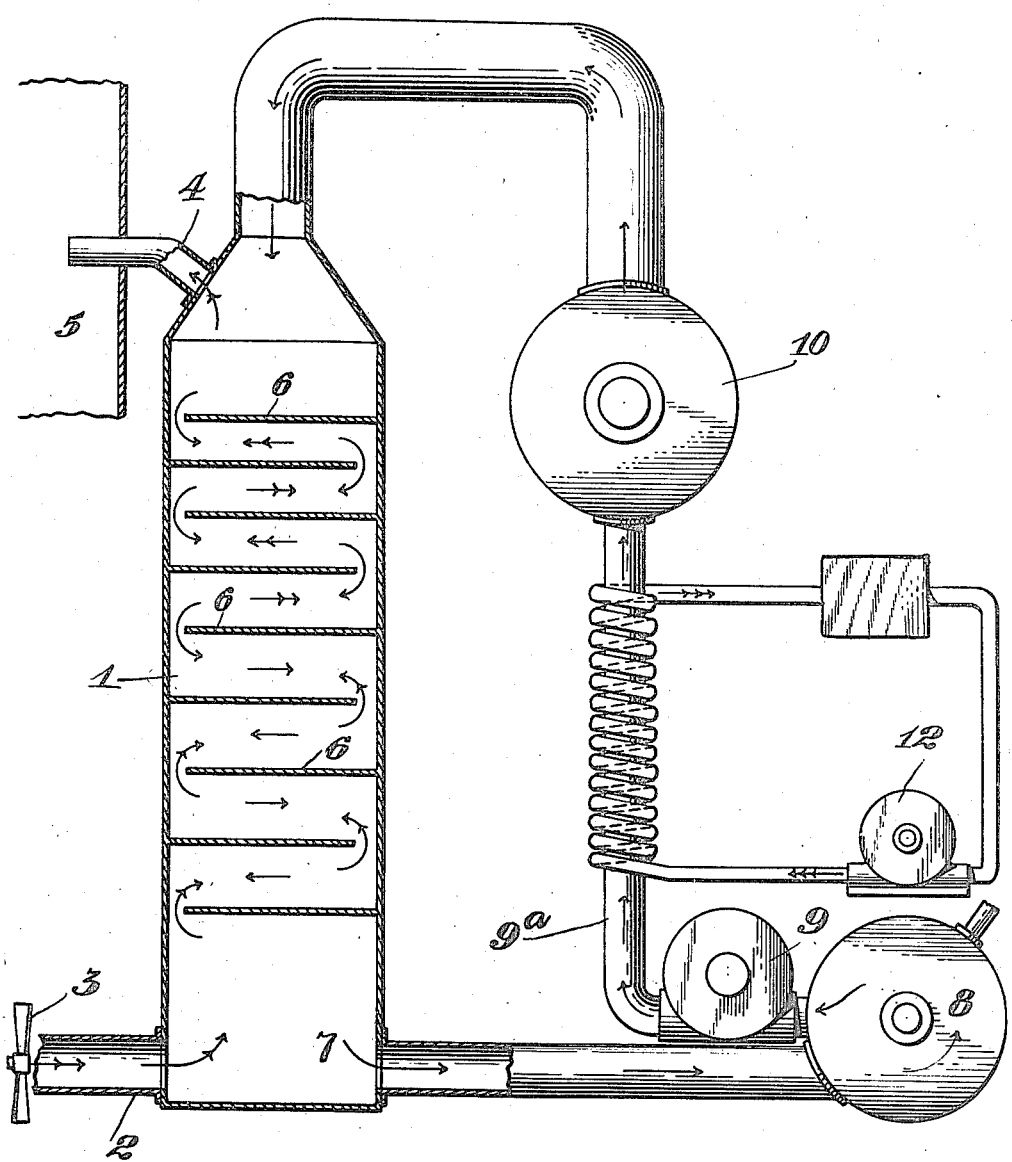

LEON GOLDMERSTEIN, (NOW BY JUDICIAL CHANGE OF NAME LEON CAMMEN,) OF NEW YORK, N. Y.

METHOD OF DESICCATING AIR FOR BLAST-FURNACE USE.

1,282,686.  Specification of Letters Patent.  Patented Oct. 22, 1918.

Application filed December 11, 1916. Serial No. 136,149.

*To all whom it may concern:*

Be it known that I, LEON GOLDMERSTEIN, a subject of the Czar of Russia, (by judicial change of name now LEON CAMMEN and now a citizen of the United States), and resident of the borough of Manhattan, in the city, county, and State of New York, have invented certain new and useful Improvements in Methods of Desiccating Air for Blast-Furnace Use, of which the following is a specification.

The present process is based on the generally fairly well known fact that the drying action of a solution of calcium chlorid is a function of two variables,—degree of concentration, and temperature at which the liquid is maintained. Thus, a 30 per cent. solution at 60 degrees Fahrenheit neither loses nor gains water when in contact with air. The same solution at 16 degrees Fahrenheit takes in moisture with great avidity. The process involves therefore the use of the following cycle of operations. In the first place air is passed through a highly concentrated solution of calcium chlorid maintained at a proper low temperature and is there freed of such moisture as it may contain. The cold brine moves in counter-current to the air, and, after meeting with the air, proceeds to an evaporator where it is freed from the excessive moisture. It is then sent on its way along a series of cooling coils, until it reaches the desired low temperature and is ready to meet the incoming air again. On its way from the evaporator to the refrigerator the warm brine flows for a part of its travel in contiguity to the cold brine going to the evaporator. There is thus an exchange of heat which in itself is a source of economy. This particular feature is not novel in itself but can be especially well utilized in the present process because of its continuity.

An essential feature of the present process is the fact that comparatively low temperatures have to be used in the evaporator. The whole process is based on the fact that the power of absorption of calcium chlorid brine of high concentration is tremendously increased by its low temperature. Thirty per cent. brine will absorb moisture with great avidity at 16 degrees Fahrenheit, but reaches its state of equilibrium at 60 degrees Fahrenheit. Hence, it will give up most of the water, which it has absorbed at a low temperature, when raised to say 100 degrees Fahrenheit, provided the vapors given off are carried away and the air over the surface of the warm brine is not allowed to reach a state of saturation. This very materially affects the heat consumption. The brine leaves the refrigerator at the temperature of about 16 degrees Fahrenheit and a concentration of about 40 per cent. By the time it leaves contact with the incoming air it has a temperature of about 25 degrees Fahrenheit and a concentration of about 30 per cent. It is important to notice in this connection that it is comparatively warm brine that first meets the warm and moist incoming air. Brine at 25 degrees Fahrenheit and 30 per cent. concentration is still perfectly capable of taking off a large amount of moisture from air at say 80 degrees Fahrenheit with a content of say 7 grains of water per cubic foot. It is well known that the main difficulty of air drying comes up when it is necessary to reduce the last one or two grains of water, but the comparatively dry and by now fairly cold air in its last stages of motion through the liquid, will pass through a layer of 40 per cent. brine at 16 degrees Fahrenheit, which is intensely hygroscopic and perfectly able to pick out of the air as much water as is desirable. Hence, the liquid is utilized in the most efficient manner possible both as to the distribution of temperatures and the distribution of concentrations. In fact while the entire process of drying is carried out in a single continuous stage, which is always the most desirable method if it can be used economically, in the present instance the introduction of the additional stages would not bring about any visible advantages.

The liquid then leaves contact with the air as we have stated above at the concentration of about thirty per cent. and say a temperature of between 25 and 30 degrees Fahrenheit. It goes to the evaporator, but on its way it travels alongside a returning flow of liquid from the evaporator having a temperature of about 70 degrees. Then again the warm brine coming from the evaporator to the refrigerator will reach the latter with the temperature of about 60 degrees from which it will have to be reduced to 16 degrees Fahrenheit.

Broadly my improved method of air-drying consists in passing the air in contact with brine to effect contact of substances whereby the moisture of the air is absorbed in the brine, the cycle of operation including succeeding evaporation of the moisture from the brine, reduction in temperature of the brine, and re-introduction of the brine at its reinstated points of temperature and concentration for maximum efficiency.

In the contra-wise flow of the air and the brine, the process of desiccation of the air in transit is progressive with the lowering in temperature and increase in concentration of the brine, from the point of the air influx into the drying apparatus and its efflux therefrom for introduction to the blast furnace; the air being at its highest moisture point where it enters said apparatus, and changing to its lowest moisture content at its point of efflux from said apparatus; this being due to the dehydrating action of the brine at its respective varying temperatures and degrees of concentration.

In other words, the brine meets the air just prior to the efflux of the latter, the brine then being at its lowest temperature and its greatest degree of concentration, in which condition it is capable of extracting the final grains of moisture from the passing air. Continued traverse of the brine beyond its initial point of contact with the passing air, raises the temperature of the brine while diminishing its concentration, so that the successive stages of the passing air between the point of its influx and efflux, both raise the temperature of the brine and diminish its concentration; whereby in these successive stages of the passage of the air, the latter, in diminishing extent, is denuded of its moisture.

The apparatus, as diagrammatically shown, may comprise a tower 1, having a lower intake 2, for air, which may be delivered from a blower 3, and a terminal exit 4, leading to a blast furnace 5. A circulating system for brine may include the tower 1, the brine passing therethrough at the opposite direction to the travel of the air; means, as baffles 6, serving to promote contact between the oppositely moving currents. The brine, flowing contra-wise through the air to the tower 1, may be at its maximum degree of concentration, for example 40 per cent., and at its lowest temperature, as for example 16° Fahrenheit, at the point where it meets the passing air. The brine, while traversing the height of the tower 1, in contact with the air, absorbs moisture from the air, thus lowering its degree of concentration; and also, by an exchange of heat units with the air as its temperature rises while the air becomes cooled, the brine therefore, at its point of leaving contact with the air, as at 7, has approximately concentration of 30 per cent. and a temperature of approximately 25° Fahrenheit; in which condition the brine passes to an evaporator 8. While passing through the evaporator, under a temperature therein of about 175° Fahrenheit, the brine acquires concentrated form again to about 40 per cent. and is impelled as by pump 9 to pass therefrom through duct 9ª, to a refrigerator 10. While in transit through duct 9ª the temperature of the brine may be lowered by suitable cooling means to a temperature of about 70° Fahrenheit. This cooling means may consist of a jacket or coil in proximity to duct 9ª and receiving water circulation as from a pump 12. The brine having its temperature lowered as stated by passing through the duct 9ª, enters the refrigerator 10, where its temperature may be reduced to about 16° Fahrenheit; thence passing back to the tower to meet the air about to issue therefrom, thus completing its cycle.

I claim:—

1. The method of desiccating air which consists in treating it with a solution of calcium chlorid brine, close to saturation, having a temperature of about 16° Fahr.

2. The method of desiccating air which consists in treating it with a solution of calcium chlorid brine, close to saturation, having an initial temperature of about 16° Fahr.

3. The method of desiccating air which consists in passing it through a solution of flowing calcium chlorid brine, close to saturation, at an initial temperature of about 16° Fahr., circulating the brine to include the passing air in its path of travel, denuding the brine of absorbed moisture, and lowering the temperature of the brine prior to its recurring contact with the passing air.

4. The method of desiccating air which consists in passing it through a solution of flowing calcium chlorid brine, close to saturation, at an initial temperature of about 16° Fahr., circulating the brine to include the passing air in its path of travel, denuding the brine of absorbed moisture, subjecting the brine to a temperature lowering influence, thence passing it through a refrigerator, and reintroducing it at the same initial temperature into contact with the passing air.

Signed at the borough of Manhattan, in the city, county and State of New York, this 9th day of December, A. D. 1916.

LEON GOLDMERSTEIN,
(*By judicial change of name now Leon Cammen.*)

Witnesses:
F. W. BARKER,
L. MOSKOWITZ.